(12) United States Patent
Sugita

(10) Patent No.: US 11,150,161 B2
(45) Date of Patent: Oct. 19, 2021

(54) TRANSMISSION TESTING DEVICE WITH CONTROLLED ABSORPTION DYNAMOMETER

(71) Applicant: A&D COMPANY, LIMITED, Tokyo (JP)

(72) Inventor: Mitsuharu Sugita, Kitamoto (JP)

(73) Assignee: A&D COMPANY, LIMITED, Tokyo (JP)

( * ) Notice: Subject to any disclaimer, the term of this patent is extended or adjusted under 35 U.S.C. 154(b) by 58 days.

(21) Appl. No.: 16/631,552

(22) PCT Filed: Jul. 19, 2018

(86) PCT No.: PCT/JP2018/027106
§ 371 (c)(1),
(2) Date: Jan. 16, 2020

(87) PCT Pub. No.: WO2019/035310
PCT Pub. Date: Feb. 21, 2019

(65) Prior Publication Data
US 2020/0200647 A1 Jun. 25, 2020

(30) Foreign Application Priority Data
Aug. 15, 2017 (JP) .............................. JP2017-156817

(51) Int. Cl.
*G01M 13/02* (2019.01)
*G01L 3/04* (2006.01)
(Continued)

(52) U.S. Cl.
CPC ............... *G01M 13/02* (2013.01); *G01L 3/04* (2013.01); *G01L 25/003* (2013.01);
(Continued)

(58) Field of Classification Search
CPC ....... G01M 13/02; G01M 15/02; G01M 17/00
See application file for complete search history.

(56) References Cited

U.S. PATENT DOCUMENTS

| 4,984,988 A | 1/1991 | Meidensha |
| 5,097,699 A * | 3/1992 | Sano ................... G01M 13/025 73/115.01 |

(Continued)

FOREIGN PATENT DOCUMENTS

| JP | S61-053541 A | 3/1986 |
| JP | H02-132341 A | 5/1990 |

(Continued)

OTHER PUBLICATIONS

PCT/ISA/210, "International Search Report for International Application No. PCT/JP2018/027106," dated Sep. 11, 2018.

*Primary Examiner* — Eric S. McCall
(74) *Attorney, Agent, or Firm* — Manabu Kanesaka

(57) ABSTRACT

A transmission testing device that can highly accurately reproduce behavior of an actual engine includes a drive dynamometer DM1 connected to an input shaft of a transmission, absorption dynamometers DM2 and DM3 that are connected to output shafts of the transmission, a shaft torque detection unit that detects a shaft torque value generated at the input shaft of the transmission, and a control unit that controls the drive dynamometer DM1. The control unit uses the shaft torque value detected by the shaft torque detection unit to generate a shaft torque correction value for the drive dynamometer DM1, receives an engine torque input value and uses the received engine torque input value to generate an engine torque correction value for the drive dynamometer DM1, and controls the drive dynamometer DM1 on the basis of a torque command value generated from the shaft torque correction value and the engine torque correction value.

4 Claims, 2 Drawing Sheets

(51) Int. Cl.
*G01L 25/00* (2006.01)
*G01M 15/02* (2006.01)
*G01M 17/00* (2006.01)
*H02P 6/06* (2006.01)

(52) U.S. Cl.
CPC ............ *G01M 15/02* (2013.01); *G01M 17/00* (2013.01); *H02P 6/06* (2013.01)

(56) References Cited

U.S. PATENT DOCUMENTS 7,921,712 B1 * 4/2011 Rindler ................. G01M 13/02
73/116.06
2007/0240517 A1 10/2007 Kingsbury et al.

FOREIGN PATENT DOCUMENTS

JP 2016-070895 A 5/2016
JP 2016-206177 A 12/2016

* cited by examiner

TRANSMISSION TESTING DEVICE WITH CONTROLLED ABSORPTION DYNAMOMETER

RELATED APPLICATIONS

The present application is National Phase of International Application No. PCT/JP2018/027106 filed Jul. 19, 2018, and claims priority from Japanese Application No. 2017-156817, filed Aug. 15, 2017, the disclosure of which is hereby incorporated by reference herein in its entirety.

TECHNICAL FIELD

The present invention relates to a testing device for performing a performance test of a transmission, and relates to a transmission testing device for performing a performance test of a transmission with dynamometers connected to both an input side and an output side of the transmission.

BACKGROUND ART

As a transmission testing device, a testing device in which a drive dynamometer is connected to an input shaft of a transmission serving as a specimen is known.

For example, Patent Literature 1 discloses, as a bench testing machine for transmissions, a transmission testing device in which a drive dynamometer is coupled to an input shaft of a transmission, which is a specimen, and transmission performance tests have thus been performed.

It has been well known that, in a transmission testing device using a drive dynamometer that simulates behavior of an actual engine as described above, there is a difference between inertia of the actual engine and inertia of the drive dynamometer, and the difference causes a mismatch between shaft torque values generated at the transmission, even if the same engine torque value is applied. It has therefore been necessary to perform inertia compensation on the drive dynamometer in order to make the two shaft torque values match with each other. As a method for inertia compensation, inertia compensation has been performed by generating a command value by multiplying a difference value between the inertia of the drive dynamometer and the inertia of the actual engine by a change in rotational speed generated at the input shaft of the transmission.

CITATION LIST

Patent Literature

Patent Literature 1: JP 2016-70895 A

SUMMARY OF INVENTION

Technical Problem

However, the command value generated by the inertia compensation is calculated using differentiation, which makes the command value vulnerable to noise and causes noise to be amplified particularly in a high frequency band. It has therefore been difficult to accurately reproduce the behavior of the actual engine in the high frequency band.

In response to the above-described problem, it is an object of the present invention to provide a transmission testing device that can highly accurately reproduce behavior of an actual engine.

Solution to Problem

The transmission testing device of the present invention has been made to solve the above-described problem. The transmission testing device using a transmission as a specimen includes a drive dynamometer connected to an input shaft of the transmission, an absorption dynamometer connected to an output shaft of the transmission, a shaft torque detection unit that detects a shaft torque value generated at the input shaft of the transmission, and a control unit that controls the drive dynamometer. The control unit uses the shaft torque value detected by the shaft torque detection unit to generate a shaft torque correction value for the drive dynamometer, receives an engine torque input value and uses the received engine torque input value to generate an engine torque correction value for the drive dynamometer, and controls the drive dynamometer on the basis of a torque command value generated from the shaft torque correction value and the engine torque correction value.

With this configuration, the behavior of the actual engine can be highly accurately reproduced, and this allows for an accurate performance test of the transmission, which is a specimen.

Further, in the transmission testing device of the present invention, the control unit obtains a shaft torque correction transfer function Hfb represented by (Equation 1) below.

[Math. 5]

$$Hfb = (He1 - Hd1) \times (1/Hd2) \qquad \text{(Equation 1)}$$

In (Equation 1), He1 represents rotational speed response of an engine alone with respect to shaft torque, Hd1 represents rotational speed response of a dynamometer alone with respect to the shaft torque, and Hd2 represents rotational speed response Hd2 of the dynamometer alone with respect to engine torque. Further, the control unit uses (Equation 2) below to obtain the shaft torque correction value from the shaft torque correction transfer function Hfb obtained using (Equation 1) above and the shaft torque value.

[Math. 6]

$$\text{Shaft torque correction value} = Hfb \times \text{Shaft torque value} \qquad \text{(Equation 2)}$$

The control unit uses (Equation 1) and (Equation 2) to generate the shaft torque correction value.

With this configuration, the drive dynamometer can reproduce the behavior of the actual engine with respect to the shaft torque.

Further, in the transmission testing device of the present invention, the control unit obtains an engine torque correction transfer function Hff represented by (Equation 3) below.

[Math. 7]

$$Hff = He2 \times (1/Hd2) \qquad \text{(Equation 3)}$$

In (Equation 3), He2 represents rotational speed response of the engine alone with respect to engine torque, and Hd2 represents rotational speed response of the dynamometer alone with respect to the engine torque.

Further, the control unit uses (Equation 4) below to obtain an engine torque correction value from the engine torque correction transfer function Hff obtained using (Equation 3) above and the engine torque input value.

[Math. 8]

$$\text{Engine torque correction value} = Hff \times \text{Engine torque input value} \qquad \text{(Equation 4)}$$

The control unit uses (Equation 3) and (Equation 4) to generate the engine torque correction value.

With this configuration, the drive dynamometer can reproduce the behavior of the actual engine with respect to the engine torque.

Further, in the transmission testing device of the present invention, the torque command value is a sum of the shaft torque correction value and the engine torque correction value.

With this configuration, the drive dynamometer can highly accurately reproduce the behavior of the actual engine in an effective frequency band of the shaft torque correction transfer function and the engine torque correction transfer function.

Advantageous Effects of Invention

According to the present invention, since behavior of an actual engine can be highly accurately reproduced by a transmission testing device using a drive dynamometer instead of an actual engine, it is possible to provide a transmission testing device that allows for an accurate performance test of a transmission, which is a specimen.

BEST MODE FOR CARRYING OUT THE INVENTION

Figure 1:
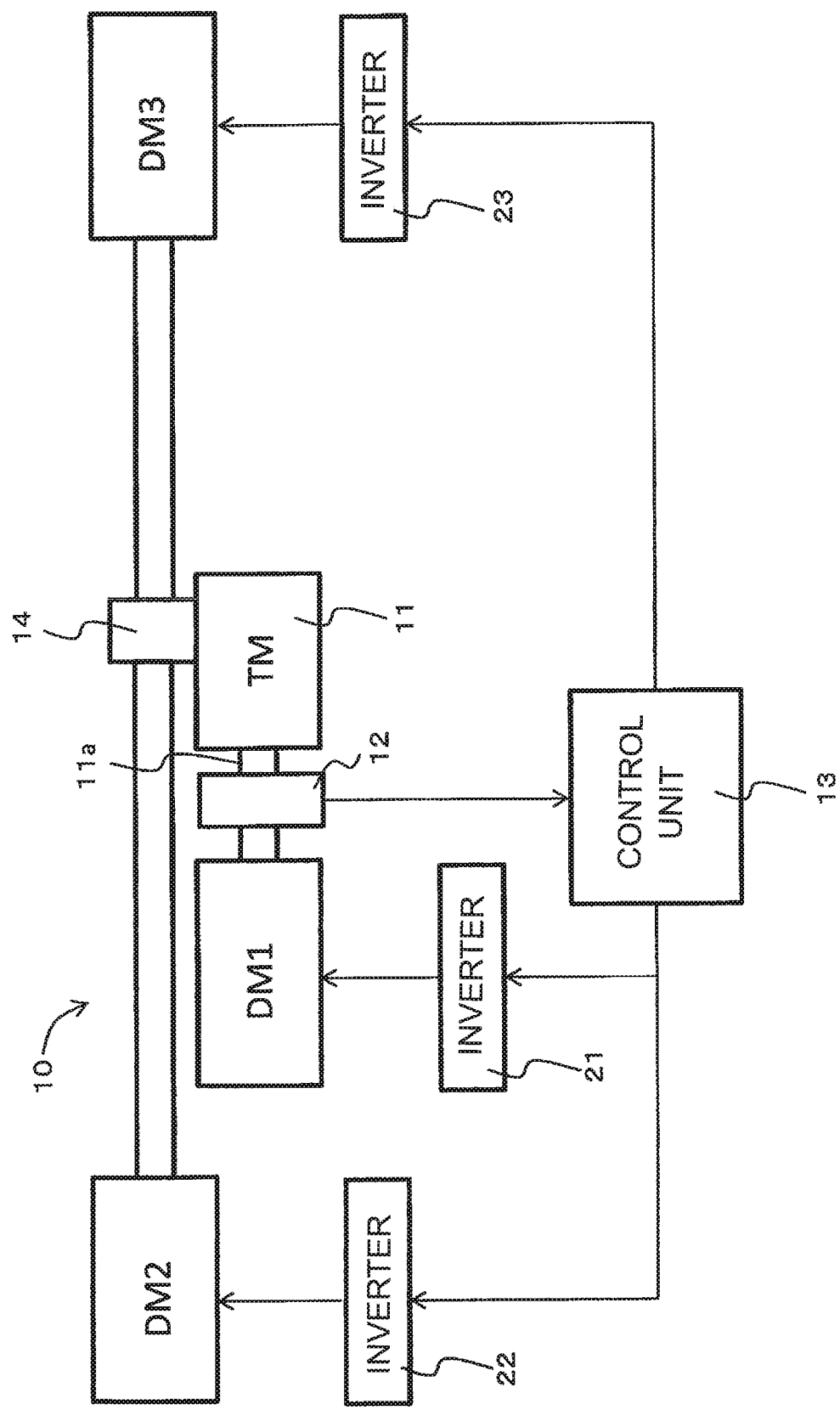
FIG. 1 is a schematic diagram illustrating an overall configuration of a transmission testing device according to an embodiment of the present invention.

A vehicle testing device 10 for performing a transmission performance test of the present embodiment will be described below with reference to FIG. 1. FIG. 1 is a schematic diagram illustrating an overall configuration of the vehicle testing device 10 according to the embodiment of the present invention.

The vehicle testing device 10 is a transmission testing device using a transmission as a specimen, and is a testing device that can acquire various types of measurement data of the transmission.

The vehicle testing device 10 includes a drive dynamometer DM1 that is connected to an input shaft 11a of a transmission 11, which is a specimen, absorption dynamometers DM2 and DM3 that are connected to a pair of output shafts of the transmission 11 via a differential gear 14, a shaft torque detection unit 12 that detects a shaft torque value generated at the input shaft 11a of the transmission 11, and a control unit 13 that controls the drive dynamometer DM1. The control unit 13 uses the shaft torque value detected by the shaft torque detection unit 12 to generate a shaft torque correction value for the drive dynamometer DM1, receives an engine torque input value and uses the received engine torque input value to generate an engine torque correction value for the drive dynamometer DM1, and controls the drive dynamometer DM1 on the basis of a torque command value generated from the shaft torque correction value and the engine torque correction value.

Further, the vehicle testing device 10 includes an inverter 21 controlled by the control unit 13 to operate the drive dynamometer DM1, an inverter 22 controlled by the control unit 13 to operate the absorption dynamometer DM2, and an inverter 23 controlled by the control unit 13 to operate the absorption dynamometer DM3.

The transmission 11 includes, for example, the input shaft 11a, a clutch, a speed change mechanism constituted by a plurality of gears, and an output shaft. Further, the transmission 11 receives, at the input shaft 11a, torque applied from the drive dynamometer DM1, and transmits the torque to the output shaft via the clutch and the speed change mechanism. Further, the torque output from the output shaft is absorbed by the absorption dynamometers DM2 and DM3 via the differential gear 14. The transmission 11 is, for example, a manual transmission, an automatic transmission, or a semi-automatic transmission.

The drive dynamometer DM1 and the absorption dynamometers DM2 and DM3 are controlled by the control unit 13. Further, internal configurations of the drive dynamometer DM1 and the absorption dynamometers DM2 and DM3 are similar to those of common dynamometers, and thus detailed description thereof is omitted.

The drive dynamometer DM1, as a substitute for an actual engine, simulates behavior of the actual engine. Further, the drive dynamometer DM1 is connected to the input shaft 11a of the transmission 11. Note that the drive dynamometer DM1 can be used as a substitute for an actual engine such as a reciprocating engine or a rotary engine.

The absorption dynamometers DM2 and DM3, as a virtual vehicle body, absorb the torque output from the output shaft of the transmission 11. The absorption dynamometers DM2 and DM3 are connected to the output shaft of the transmission 11 via the differential gear 14.

The shaft torque detection unit 12 is disposed on the input shaft 11a of the transmission 11, and detects a shaft torque value generated at the input shaft 11a of the transmission 11. Then, the shaft torque detection unit 12 transmits the detected shaft torque value to the control unit 13.

The control unit 13 receives the shaft torque value transmitted from the shaft torque detection unit 12. Further, the control unit 13 receives an engine torque input value input from an information processor (not illustrated).

Further, the control unit 13 uses a shaft torque correction transfer function Hfb described later to generate a shaft torque correction value on the basis of the shaft torque value detected by the shaft torque detection unit 12. Further, the control unit 13 uses an engine torque correction transfer function Hff described later to generate an engine torque correction value on the basis of the received engine torque input value.

Then, the control unit 13 controls the drive dynamometer DM1 on the basis of a torque command value generated from the shaft torque correction value and the engine torque correction value.

Figure 2:
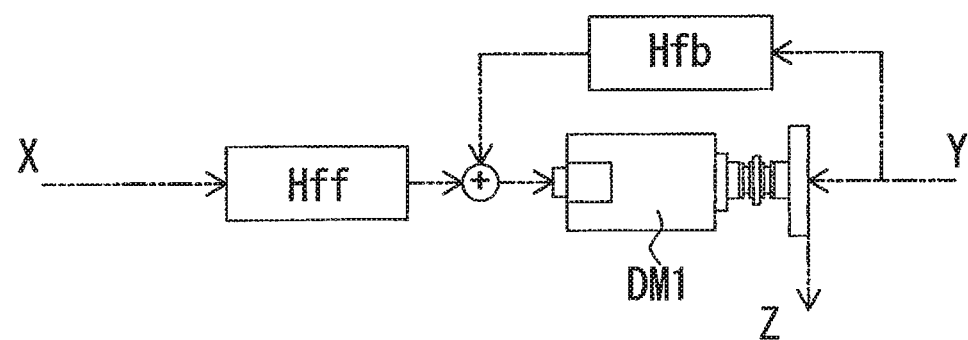
FIG. 2 is a schematic diagram illustrating a functional configuration of a control unit of the transmission testing device according to the embodiment of the present invention.

Here, control on the drive dynamometer DM1 by the control unit 13 will be described with reference to FIG. 2. FIG. 2 is a schematic diagram illustrating a functional configuration of the control unit 13 of the vehicle testing device 10. In FIG. 2, X represents an engine torque input value, Y represents shaft torque, and Z represents a rotational speed of the drive dynamometer DM1.

The control unit 13 causes the drive dynamometer DM1 to reproduce behavior of an actual engine by generating a torque command value for the drive dynamometer DM1 and outputting the generated torque command value to the inverter 21. Then, the inverter 21 supplies power to the drive dynamometer DM1 on the basis of the torque command value to control operation of the drive dynamometer DM1.

In the present embodiment, the control unit 13 performs control illustrated in FIG. 2 on the drive dynamometer DM1.

First, the control unit 13 performs compensation for a shortage of the shaft torque Y on the drive dynamometer DM1. Specifically, the control unit 13 receives a shaft torque value detected by the shaft torque detection unit 12, and calculates a shaft torque correction value using a shaft torque correction transfer function Hfb represented by (Equation 1).

[Math. 9]

$$Hfb=(He1-Hd1)\times(1/Hd2) \qquad \text{(Equation 1)}$$

In (Equation 1), He1 represents rotational speed response of an engine alone with respect to shaft torque, Hd1 represents rotational speed response of a dynamometer alone with respect to the shaft torque, and Hd2 represents rotational speed response of the dynamometer alone with respect to engine torque. Here, He1 is obtained from various specifications and data, such as inertia and rigidity, of the actual engine to be substituted by the drive dynamometer DM1. Specifically, He1 is calculated from a design value of the actual engine to be substituted, and is stored in advance in a storage unit (not illustrated). Further, Hd1 and Hd2 are obtained from various specifications and data, such as inertia and rigidity, of the drive dynamometer DM1. Specifically, Hd1 and Hd2 are calculated from design values of the drive dynamometer DM1, and are stored in advance in the storage unit (not illustrated). Further, Hd1 and Hd2 may be identified and obtained from measurement data of the drive dynamometer DM1 that constitutes the vehicle testing device 10, before various evaluation tests of the transmission 11.

Further, He1–Hd1 in (Equation 1) represents a transfer function for an insufficient rotational speed at the input shaft 11a of the transmission 11. Further, 1/Hd2 represents a torque transfer function necessary for reproduction of the rotational speed. The control unit 13 of the present embodiment extracts He1, Hd1, and Hd2 stored in the storage unit (not illustrated), and performs (Equation 1).

The shaft torque correction transfer function Hfb calculated using (Equation 1) as described above is a correction transfer function that makes the rotational speed response of the engine alone with respect to the shaft torque value and the rotational speed response of the dynamometer alone with respect to the shaft torque correction value match with each other.

Then, the control unit 13 uses (Equation 2) to generate a shaft torque correction value by multiplying the shaft torque correction transfer function Hfb calculated using (Equation 1) by the shaft torque value detected by the shaft torque detection unit 12. In accordance with the shaft torque correction value thus generated, the control unit 13 can control the drive dynamometer DM1 so as to reproduce the behavior of the actual engine with respect to the shaft torque. Note that the control unit 13 can perform, in real time, the processing of calculating the shaft torque correction value using (Equation 1) and (Equation 2).

[Math. 10]

$$\text{Shaft torque correction value}=Hfb\times\text{Shaft torque value} \qquad \text{(Equation 2)}$$

Note that (Equation 1) and (Equation 2) are stored in advance in the storage unit (not illustrated), for example. Next, compensation for a shortage of the engine torque input value X is performed on the drive dynamometer DM1.

Specifically, the control unit 13 receives the engine torque input value X, and uses the engine torque correction transfer function Hff represented by (Equation 3) to calculate an engine torque correction value for the drive dynamometer DM1.

[Math. 11]

$$Hff=He2\times(1/Hd2) \qquad \text{(Equation 3)}$$

Here, in (Equation 3), He2 represents rotational speed response of the engine alone with respect to engine torque, and 1/Hd2 represents a torque transfer function necessary for reproduction of the rotational speed. Here, He2 is obtained from various specifications and data, such as inertia and rigidity, of the actual engine to be substituted by the drive dynamometer DM1. Specifically, He2 is calculated from a design value of the actual engine to be substituted, and is stored in the storage unit (not illustrated). The control unit 13 of the present embodiment extracts He2 and Hd2 stored in the storage unit (not illustrated), and performs (Equation 3).

The engine torque correction transfer function Hff calculated using (Equation 3) is a correction transfer function that makes the rotational speed response of the engine alone with respect to the engine torque input value and the rotational speed response of the dynamometer alone with respect to the engine torque correction value match with each other.

Then, the control unit 13 may use (Equation 4) to generate an engine torque correction value by multiplying the engine torque correction transfer function Hff calculated using (Equation 3) by the engine torque input value X. In accordance with the engine torque correction value thus generated, the control unit 13 can control the drive dynamometer DM1 so as to reproduce the behavior of the actual engine with respect to the engine torque. Note that the control unit 13 can perform, in real time, the processing of calculating the engine torque correction value using (Equation 3) and (Equation 4).

[Math. 12]

$$\text{Engine torque correction value}=Hff\times\text{Engine torque input value } X \qquad \text{(Equation 4)}$$

Note that (Equation 3) and (Equation 4) are stored in advance in the storage unit (not illustrated), for example.

On the basis of the shaft torque correction value and the engine torque correction value calculated using (Equation 1) to (Equation 4), the control unit 13 controls the drive dynamometer DM1. Specifically, a value obtained by adding the shaft torque correction value and the engine torque correction value is output as a torque command value to the inverter 21, and is output to the drive dynamometer DM1. Then, the inverter 21 supplies power to the drive dynamometer DM1 on the basis of the torque command value to control operation of the drive dynamometer DM1.

A hardware configuration of a control apparatus provided with the control unit 13 is not particularly limited. The control apparatus may be constituted by a computer (one or a plurality of computers) including a CPU, an auxiliary storage device, a main storage device, a network interface, and an input/output interface, for example. In this case, the input/output interface is connected with the shaft torque detection unit 12 and the information processor (not illustrated) that transmits the engine torque input value X. Further, the auxiliary storage device stores a program (computer program) for implementing functions of each of the above-described units (the shaft torque detection unit 12 and the control unit 13) (for example, (Equation 1) to (Equation 4)). Then, the functions of the above-described units (the shaft torque detection unit 12 and the control unit 13) are implemented by the CPU loading the program on the main storage device and executing the program.

The vehicle testing device 10 controls the operation of the drive dynamometer DM1 on the basis of the shaft torque correction value calculated using the shaft torque correction transfer function Hfb and the engine torque correction transfer function Hff, and the engine torque correction value. This allows for accurate reproduction of the behavior of the actual engine in an effective frequency band of the shaft torque correction transfer function Hfb and the engine torque correction transfer function Hff. That is, the vehicle testing device 10 can accurately perform a performance test of the transmission 11 without using the actual engine, and can acquire various types of measurement data of the transmission 11.

Modifications and the Like of Embodiment

The invention disclosed herein includes, in addition to the configurations of the inventions and embodiments, those identified with these configurations partially changed to other configurations disclosed herein, within the applicable range, those identified with other configurations disclosed herein added to these configurations, or a superordinate concept of those specified with these configurations partially deleted to an extent that partial effects can be obtained. Moreover, the modifications below and the like are also included.

In the vehicle testing device 10 of the present embodiment, the control unit 13 controls the drive dynamometer DM1. The control unit 13 may also control the absorption dynamometers DM2 and DM3 in a similar manner.

The control unit 13 of the vehicle testing device 10 of the present embodiment may obtain the shaft torque correction transfer function Hfb or the engine torque correction transfer function Hff via a filter such as a low-pass filter. This can prevent an influence of oscillation of the vehicle testing device 10 or the like.

REFERENCE SIGNS LIST

10 Vehicle testing device
11 Transmission
11a Input shaft
12 Shaft torque detection unit
13 Control unit
14 Differential gear
21, 22, 23 Inverter
DM1 Drive dynamometer
DM2, DM3 Absorption dynamometer
Hfb Shaft torque correction transfer function
Hff Engine torque correction transfer function

The invention claimed is:

1. A transmission testing device using a transmission as a specimen, the transmission testing device comprising:
a drive dynamometer connected to an input shaft of the transmission;
an absorption dynamometer connected to an output shaft of the transmission;
a shaft torque detection unit that detects a shaft torque value generated at the input shaft of the transmission; and
a control unit that controls the drive dynamometer,
wherein the control unit uses the shaft torque value detected by the shaft torque detection unit to generate a shaft torque correction value for the drive dynamometer, receives an engine torque input value and uses the received engine torque input value to generate an engine torque correction value for the drive dynamometer,
the control unit controls the drive dynamometer on a basis of a torque command value generated from the shaft torque correction value and the engine torque correction value,
the control unit obtains a shaft torque correction transfer function Hfb represented by (Equation 1) below $$Hfb=(He1-Hd1)\times(1/Hd2) \quad \text{(Equation 1)}$$

(in (Equation 1), He1 represents rotational speed response of an engine alone with respect to shaft torque, Hd1 represents rotational speed response of a dynamometer alone with respect to the shaft torque, and Hd2 represents rotational speed response Hd2 of the dynamometer alone with respect to engine torque), and
the control unit uses (Equation 2) below $$\text{Shaft torque correction value}=Hfb\times\text{Shaft torque value} \quad \text{(Equation 2)}$$

to generate the shaft torque correction value from the shaft torque correction transfer function Hfb obtained using (Equation 1) above and the shaft torque value.

2. The transmission testing device according to claim 1, wherein the torque command value is a sum of the shaft torque correction value and the engine torque correction value.

3. A transmission testing device using a transmission as a specimen, the transmission testing device comprising:
a drive dynamometer connected to an input shaft of the transmission;
an absorption dynamometer connected to an output shaft of the transmission;
a shaft torque detection unit that detects a shaft torque value generated at the input shaft of the transmission; and
a control unit that controls the drive dynamometer,
wherein the control unit uses the shaft torque value detected by the shaft torque detection unit to generate a shaft torque correction value for the drive dynamometer, receives an engine torque input value and uses the received engine torque input value to generate an engine torque correction value for the drive dynamometer,
the control unit controls the drive dynamometer on a basis of a torque command value generated from the shaft torque correction value and the engine torque correction value,
the control unit obtains an engine torque correction transfer function Hff represented by (Equation 3) below $$Hff=He2\times(1/Hd2) \quad \text{(Equation 3)}$$

(in (Equation 3), He2 represents rotational speed response of the engine alone with respect to engine torque, and Hd2 represents rotational speed response of the dynamometer alone with respect to the engine torque), and
the control unit uses (Equation 4) below $$\text{Engine torque correction value}=Hff\times\text{Engine torque input value} \quad \text{(Equation 4)}$$

to generate the engine torque correction value from the engine torque correction transfer function Hff obtained using (Equation 3) above and the engine torque input value.

4. The transmission testing device according to claim 3, wherein the torque command value is a sum of the shaft torque correction value and the engine torque correction value.

\* \* \* \* \*